(12) United States Patent
Mountain

(10) Patent No.: US 6,666,816 B2
(45) Date of Patent: Dec. 23, 2003

(54) INFANT SUPPORT THERMAL CONTROL SYSTEM AND METHOD

(75) Inventor: Michael F. Mountain, Doylestown, PA (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 10/123,644

(22) Filed: Apr. 16, 2002

(65) Prior Publication Data

US 2002/0161276 A1 Oct. 31, 2002

Related U.S. Application Data

(60) Provisional application No. 60/283,972, filed on Apr. 16, 2001.

(51) Int. Cl.[7] .............................................. A61G 11/00
(52) U.S. Cl. ...................................................... 600/22
(58) Field of Search .................. 600/22, 549; 392/403, 392/418; 5/655; 128/203, 27

(56) References Cited

U.S. PATENT DOCUMENTS

| | | | |
|---|---|---|---|
| 4,750,474 A | * | 6/1988 | Dukhan et al. ................ 600/22 |
| 5,453,077 A | * | 9/1995 | Donnelly et al. .............. 600/22 |
| 5,759,149 A | | 6/1998 | Goldberg et al. |
| 5,817,002 A | | 10/1998 | Donnelly et al. |
| 5,817,003 A | | 10/1998 | Moll et al. |
| 5,971,913 A | | 10/1999 | Newkirk et al. |
| 5,971,914 A | | 10/1999 | Donnelly et al. |
| 6,022,310 A | | 2/2000 | Goldberg et al. |
| 6,024,694 A | | 2/2000 | Goldberg et al. |
| 6,036,634 A | | 3/2000 | Goldberg et al. |
| 6,049,924 A | | 4/2000 | Prows et al. |
| 6,071,228 A | | 6/2000 | Speraw et al. |
| 6,213,935 B1 | | 4/2001 | Mackin et al. |
| 6,270,452 B1 | | 8/2001 | Donnelly et al. |
| 6,290,643 B1 | * | 9/2001 | Falk et al. ..................... 600/22 |
| 6,296,606 B1 | | 10/2001 | Goldberg et al. |
| 6,345,402 B1 | | 2/2002 | Prows et al. |
| 6,464,627 B1 | * | 10/2002 | Falk ............................. 600/22 |
| 2002/0188168 A1 | * | 12/2002 | Koch ........................... 600/22 |

FOREIGN PATENT DOCUMENTS

| | | |
|---|---|---|
| DE | 10010720 A1 | 11/2000 |
| GB | 2 175 213 A | 11/1986 |

* cited by examiner

*Primary Examiner*—Samuel G. Gilbert
(74) *Attorney, Agent, or Firm*—Barnes & Thornburg

(57) ABSTRACT

A control system and a method for controlling an infant support configurable in a closed configuration in which a canopy contributes to formation of an enclosure about an infant support surface, and an open configuration is disclosed. The controlled infant support includes an air heater, a blower, and duct work communicating with the air heater, blower and enclosure. To facilitate bringing the air temperature within the enclosure quickly to a desired temperature whereby the temperature of an infant in the enclosure is controlled, power is supplied to air heater when infant support is in the open configuration to generate a heat reservoir. Upon the infant support assuming the closed configuration the controller controls power to the blower to increase air flow and infuse heat from the heat reservoir into the enclosure.

51 Claims, 8 Drawing Sheets

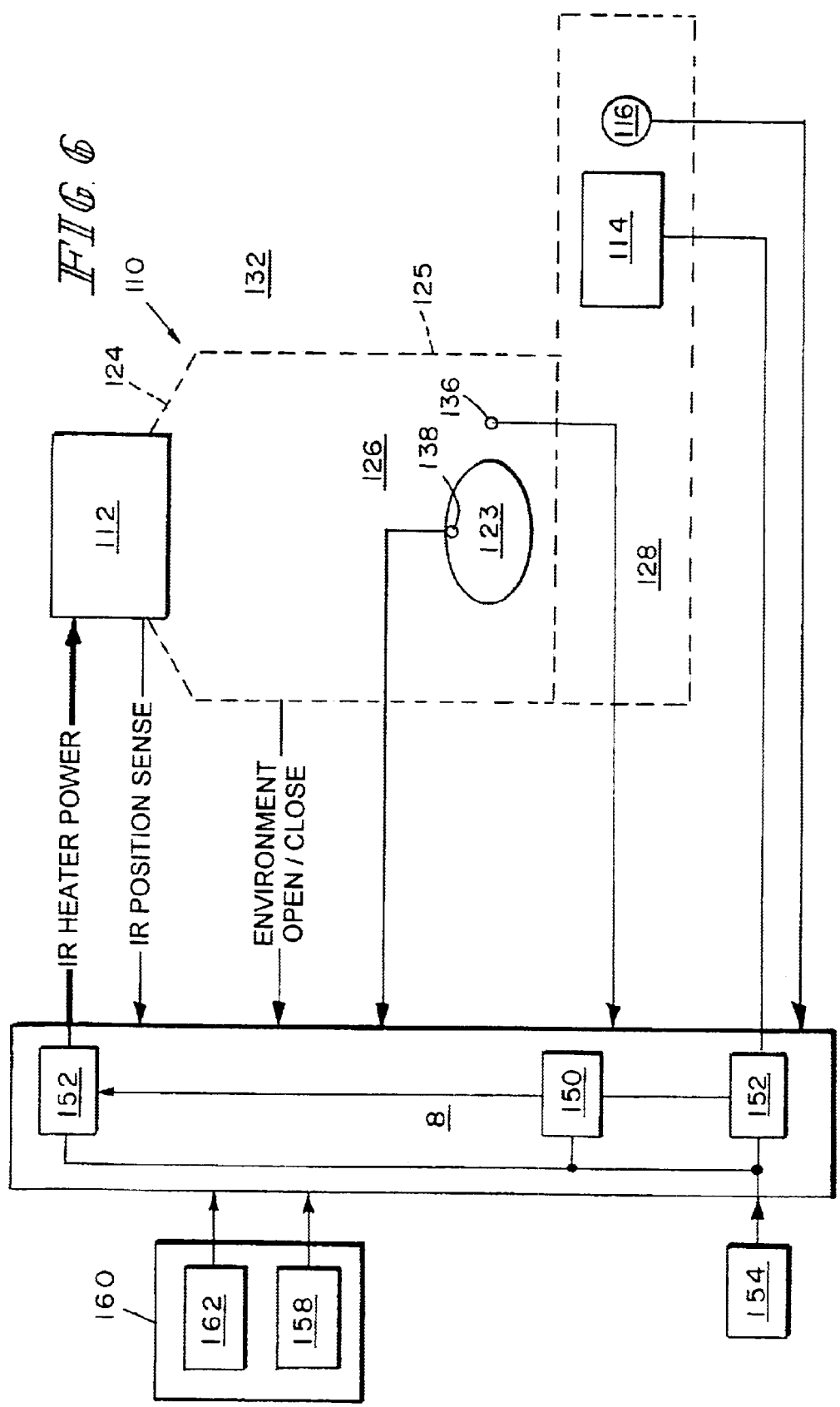

INFANT SUPPORT THERMAL CONTROL SYSTEM AND METHOD

This application claims the benefit of Provisional Application No. 60/283,972 filed Apr. 16, 2001.

The present invention relates to infant supports that provide both incubator and warmer configurations, and, more particularly, to temperature control systems for such infant supports during transition between incubator and warmer configurations.

Newborns and premature infants often require isolation in a controlled environment for proper development. Incubators provide such an environment by providing a canopy forming an enclosure surrounding an infant support surface. The environment within the enclosure is controlled so that the oxygen content, air temperature, noise levels and other environmental parameters are maintained at levels conducive to infant development. The air temperature within the enclosure is an environmental factors which highly influences an infant's core temperature as indicated by its skin temperature. Incubators include temperature sensors to provide an indication of the air temperature within the enclosure and an indication of the skin temperature of the infant. The air temperature within the enclosure is adjusted by infusion of warmed air into the enclosure. Warm air infusion is accomplished by a system including a blower or fan for drawing external and/or internal air past a heater for introduction into the enclosure through orifices.

Often newborns and infants also require various procedures to be performed on them by one or more caregivers. While the canopy and walls of an incubator includes access panels and orifices permitting access to an infant within the enclosure, this access is often too limited to perform all of the necessary procedures. Warmers provide relatively unobstructed access to an infant or newborn. Typically when relatively unobstructed access to an infant in a dedicated incubator is required, the infant is moved from the dedicated incubator to a dedicated warmer. The movement disturbs the infant and often requires the removal of sensors and tubes which further disturbs the infant. The move from the incubator to the warner typically does not adversely affect the core temperature of the infant. After the procedures are performed on the infant, the infant is typically returned to an incubator. Insertion of the infant into the incubator requires reconfiguration of the access panels in the walls canopy permitting warmed air to escape from the enclosure. Often the time required for the incubator to stabilize the skin temperature of the infant is unduly long.

Infant supports having the capability to serve as both incubators and warmers are known and were developed to address sone of the issues arising from the use of dedicated incubators and dedicated warmers. Such infant supports are shown and described in Donnelly et al., U.S. Pat. No. 5,453,077, issued Sep. 26, 1995; Donnelly et al., U.S. Pat. No. 5,817,002, issued Oct. 6, 1998; Moll et al., U.S. Pat. No. 5,817,003, issued Oct. 6, 1998; Goldberg et al., U.S. Pat. No. 5,759,149, issued Jun. 2, 1998; Newkirk et al., U.S. Pat. No. 5,971,913, issued Oct. 26, 1999; Donnelly et al., U.S. Pat. No. 5,971,914, issued Oct. 26, 1999; Goldberg et al., U.S. Pat. No. 6,022,310, issued Feb. 8, 2000, Goldberg et al., U.S. Pat. No. 6,024,694, issued Feb. 15, 2000; Goldberg et al., U.S. Pat. No. 6,036,634, issued Mar. 14, 2000, Prows et al., U.S. Pat. No. 6,049,924, issued Apr. 18, 2000; Speraw et al., U.S. Pat. No. 6,071,228, issued Jun. 6, 2000; Donnelly et al., U.S. Pat. No. 6,270,452, issued Aug. 7, 2001; Goldberg et al., U.S. Pat. No. 6,296,606, issued Oct. 2, 2001; and Prows et al., U.S. Pat. No. 6,345,402, issued Feb. 12, 2002, the complete disclosures of which are hereby expressly incorporated by reference. Such infant supports are also shown and described in U.S. patent application Ser. No. 09/688,528 filed on Oct. 16, 2000 and U.S. patent application Ser. No. 09/571,449, filed on May 16, 2000, assigned to the common assignee of the present application, the complete disclosures of which are hereby expressly incorporated by reference.

Such incubator/warmers include an infant support surface resting on a housing that incorporates systems similar to standard incubators facilitating control of the environment surrounding the infant when the canopy and walls are configured in a closed state and the incubator/warmer is acting in incubator mode. The incubator/warmer 110 also includes a radiant heater which directly warms the skin of the infant when some or all of the canopy and walls are configured to an open state and the incubator/warmer is in a warmer configuration. Such incubator/warmers are adapted to facilitate a transition from incubator to warmer configuration and from warmer to incubator configuration. During transition from incubator to warmer configuration, the walls and the canopy are configured to provide relatively unobstructed access to the infant and an infrared radiant heater is activated to directly warm the skin of the infant. When the walls and the canopy are configured to provide such free access, the warm air adjacent the infant dissipates throughout the room in which the incubator/warmer is located. Thus, the air adjacent the infant quickly approaches the ambient air temperature of the room allowing convective heat loss from the infant's skin to the surrounding air. The infrared heater, by directly warming the infant's skin is able to compensate quickly for the convective heat loss from the infant to maintain the core temperature of the infant at desired levels.

When the incubator/warmer is transited from the warmer configuration to the incubator configuration, the walls and canopy are configured to a closed state forming an enclosure around the infant support surface. During transition to the closed state air at or near ambient room temperature may be trapped within the enclosure. Certain infrared radiant heaters are not very effective in maintaining the infant's skin temperature when the walls and the canopy are closed because the canopy and walls may be opaque to infrared radiation or the refractive index of the optically transparent walls and canopy may cause reflection of much of the incident infrared radiation. Thus, after transition from warmer configuration to incubator configuration, time is required to raise the temperature of the air within the enclosure from near ambient room temperature to a temperature sufficient to maintain the skin and core temperature of the infant. It has been found that fluctuations in the core temperature of an infant can adversely affect their development.

The infant support thermal control system disclosed herein controls a convective heater and blower of an infant support during a priming stage when the support is acting as a warmer to reduce the time required for the support to stabilize the temperature of the infant at desired levels after transition to incubator configuration. The control system may also control the radiant heater of an incubator/warmer in warmer configuration and the convective heater and blower of the incubator/warmer after transition between warmer configuration and incubator configuration. The controller operates the blower and convective heater during the priming stage to reduce the time required for the incubator/warmer to stabilize the temperature of the infant at desired levels. The controller may also control infrared heater operation in the warmer configuration to compensate for infant heating attributable to the operation of the blower and convective heater during the primer stage.

Typically, during the incubator configuration, an infant is isolated from the outside environment by side and end walls cooperating with a canopy that surrounds an infant support surface forming an enclosure. A convective heater and blower are provided in the support to direct warm air into the enclosure for controlling the temperature of the air therein. Such a system typically comprises a blower, a heater and passageways. The passageways communicate between the heater and blower to direct warm air produced by the heater and blower into the enclosure. During the warmer mode, the canopy is raised and the enclosure is opened. A radiant heater is also typically included with the support to direct radiant heat to the infant while exposed to the outside environment.

Temperature sensors are also provided with the infant support to monitor and control the temperature and relative humidity of the air adjacent the infant. Such sensors are shown and described in U.S. Provisional Patent Application Nos. 60/199,103, entitled Fail Safe Device for Incubator & Warmer, filed on Apr. 21, 2000, and 60/258,011, entitled Humidity Sensor for Incubator, filed on Dec. 22, 2000, the complete disclosures of which are hereby expressly incorporated by reference. Illustratively, the fail-safe device includes a temperature sensor assembly wherein one sensor is associated with a heating element that generates the heat, and a second sensor is associated with at least one of a plurality of air-contacting fins that distributes the heat. The second sensor is a back-up that provides an independent measurement of the temperature that can be correlated with the temperature measurement of the first sensor. A control system is also provided that monitors the sensors to prevent the infant support from becoming too warm.

The illustrative humidity sensor is an assembly that comprises a first sensor spaced apart from the infant positioned on the support surface. The temperature of the air drawn from the enclosure is measured. In addition, the temperature of the air adjacent a humidity sensor is measured by a second sensor.

In conventional incubator/warmers, during transition of the infant support from the incubator to warmer configuration, the infrared heater elements typically respond quickly enough to maintain the infant's core temperature within a reasonable variation. When transiting the infant support from the warmer to incubator configuration, however, the response of the convective heater may be inadequate to maintain the infant's core temperature within the reasonable variation.

Conventionally, during the incubator mode, the temperature of the air adjacent the infant maintains the temperature of the infant. During warmer mode, however, the convective heater is often not used. Rather, the radiant heater warms the infant directly. The radiant heater, however, does not warm the surrounding air. Because the incubator/warmer, when in the warmer configuration, does not isolate the infant from the outside environment, a temperature change occurs in the air adjacent the infant. Consequently, during the return transition from warmer to incubator configuration, the initial temperature of the air inside the enclosure is closer to that of the outside environment, which is most often lower than the desired air temperature for the incubator mode. Substantial time may be required for the convective heating system to warm the enclosure to the desired temperature.

Accordingly, the thermal control system of the present disclosure reduces the time it takes for the enclosure to reach the desired temperature after the support transitions from the warmer to the incubator configuration. During the warmer mode, the infant support illustratively uses a variable priming mechanism to regulate a thermal infusion of a known magnitude at transition. This will allow for a rapid response to the transition, since the convective heater will already be warmed. In addition, heating the surfaces and volumes within the air passages creates a heat reservoir, which may be infused into the enclosure after transition from warmer configuration to incubator configuration to quickly increase the air temperature needed to sustain the core temperature of the infant. Upon transition into incubator configuration, the infant support will adapt the convective PID error for convergence to the targeted temperature set point.

An incubator/warmer, in accordance with one aspect of the disclosure, includes an infant support, a canopy, a convective heating system, a radiant warmer and a control system. The canopy provides an enclosure about the infant support and an infant residing on the support when the incubator/warmer is in an incubator configuration. The canopy is retractable to place incubator/warmer in a warmer configuration. The convective heater system includes an air heater, a blower and passageways through which air is circulated by the blower to provide heated air to the enclosure. The radiant warmer is positioned to warm the infant on the support when the canopy is retracted and the incubator/warmer is in the warmer configuration. The control system is configured to rapidly bring air in the enclosure to a target temperature when the incubator/warmer transitions from the warmer configuration to the heater configuration. The control system includes a priming stage algorithm that maintains air in the passageways of the convective heater system at a priming temperature by controlling power to the air heater while the incubator/warmer is in the warmer configuration and an infusion stage algorithm that controls the blower to drive air from the passageways into the enclosure to rapidly warm the enclosure after transition of the incubator/warmer to the incubator configuration. The incubator/warmer may also include a convergence stage algorithm that controls the blower to drive warmed air into the enclosure until the target temperature is reached.

According to another aspect of the disclosure, a control system for an infant support of the type capable of assuming and transiting between an incubator configuration wherein an enclosure is defined around an infant support surface and a warmer configuration is disclosed. The infant support has a radiant heater supplied with power in the warmer configuration, a convective heater, a blower and duct work communicating with the enclosure, convective heater and blower. The control system includes a convective heater controller and a blower controller. The convective heater controller controls the power to the convective heater prior to the infant support assuming the incubator configuration so as to prewarm portions of the duct work past which air to be infused into the enclosure will pass. The blower controller controls the power to a blower to provide a slight air flow prior to the infant support assuming the incubator configuration and to provide an increased air flow upon the infant support assuming the incubator configuration.

According to another aspect of the disclosure, a control system for an infant support of the type capable of assuming and transiting between a closed configuration wherein an enclosure is defined around an infant support surface and an open configuration is provided. The infant support has a convective heater, a blower and duct work communicating with the enclosure, convective heater and blower. The control system includes a convective heater controller and a blower controller. The convective heater controller controls the power to the convective heater prior to the infant support duct work assuming the closed configuration so as to prewarm portions of the duct work past which air to be infused into the enclosure will pass. The blower controller controls the power to the blower to provide a slight air flow prior to the infant support assuming the closed configuration.

According to yet another aspect of the disclosure a method of controlling the temperature of an infant in an incubator/warmer is provided. The incubator/warmer is of the type having an open configuration for operating as an infant warmer, a closed configuration forming an enclosure for operating as an incubator. The incubator/warmer includes a housing supporting an infant support, an air temperature sensor positioned to be within the enclosure when the incubator/warmer is in the closed configuration, a radiant heater, and an air heating system including an air heater, a blower and duct work located in the housing below the infant support. The duct work is in fluid communication with the enclosure. The method comprises the steps of operating the air heater while the incubator/warmer is in the open configuration to generate a heat reservoir and infusing the heat from the generated heat reservoir into the enclosure upon incubator/warmer attaining the closed configuration.

Additional features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

In describing the invention, reference is made to the following drawings in which:

FIG. 6 is a block diagram of a heater control system and components of the support of FIG. 1;

FIG. 7 is a flow diagram of the priming stage algorithm;

DETAILED DESCRIPTION

Figure 1:
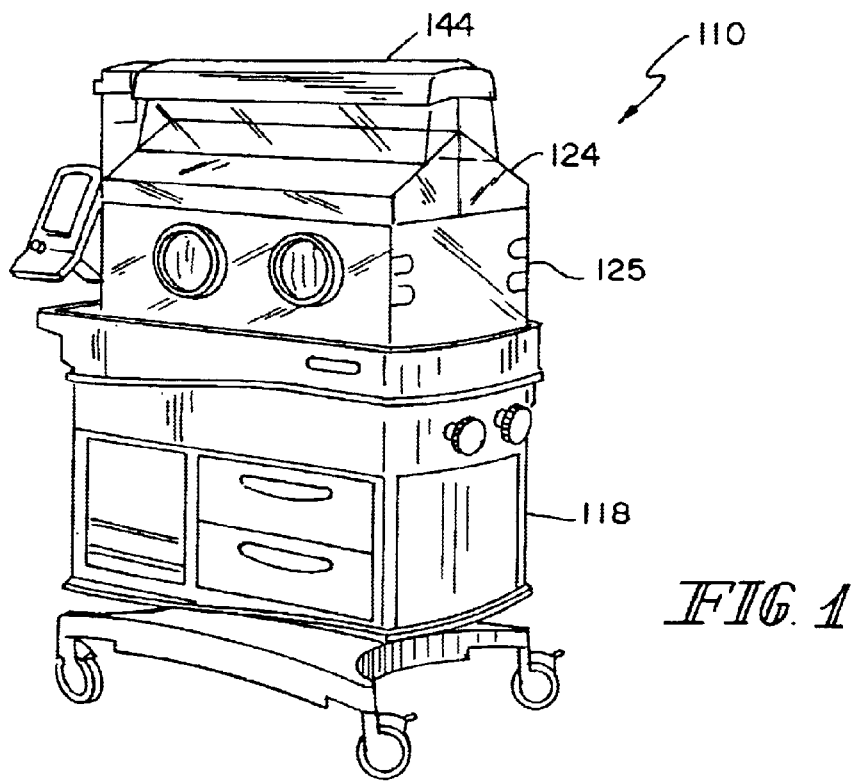
FIG. 1 is a perspective view of an infant support in a closed configuration conducive to operation of the support in incubator configuration.

Infant support thermal control system 8 disclosed herein controls at least one of a radiant heater 112, air heater or convective heater 114, and blower 116 of an incubator/warmer 110 to reduce the time required for incubator/warmer 110 to maintain an infant's temperature at desired levels upon entry into incubator configuration.

As shown for example in FIGS. 1–6, and the patents mentioned above, incubator/warmer 110 includes a platform assembly 118, an infant support surface or deck 120 typically supporting a mattress 122 upon which an infant 123 rests, a canopy 124 configurable to cooperate with hinged walls 125 and fixed walls 127 to form an enclosure 126 surrounding infant support surface 120, air passages or duct work 128, air intakes 130 in communication with the interior of enclosure 126 and the exterior 132 and warm air orifices 134 in communication with the interior of enclosure 126. In the illustrated embodiment, blower 116 draws air from interior and/or exterior air intakes 130 through duct work 128 past convective heater 114 and discharges the air through warm air orifices 134 into enclosure 126. Air movement is induced by blower 116 which is in fluid communication with duct work 128. Illustratively, blower 116 and convective heater 114 are coupled to a heater accessory plate 129 mounted in duct work 128. In the illustrated embodiment, duct work 128, convective heater 114, and blower 116 are all located in the platform assembly 118 that supports infant support surface or deck 120. Thus the surfaces of duct work 128, blower 116, and convective heater 114 are referred to as below deck surfaces. Illustratively, incubator/warmer 110 also includes air temperature sensors 136 and skin temperature sensors 138. Controller 8 is communicatively coupled with air temperature sensor 136, skin temperature sensor 138, radiant heater 112, convective heater 114 and blower 116.

Figure 2:
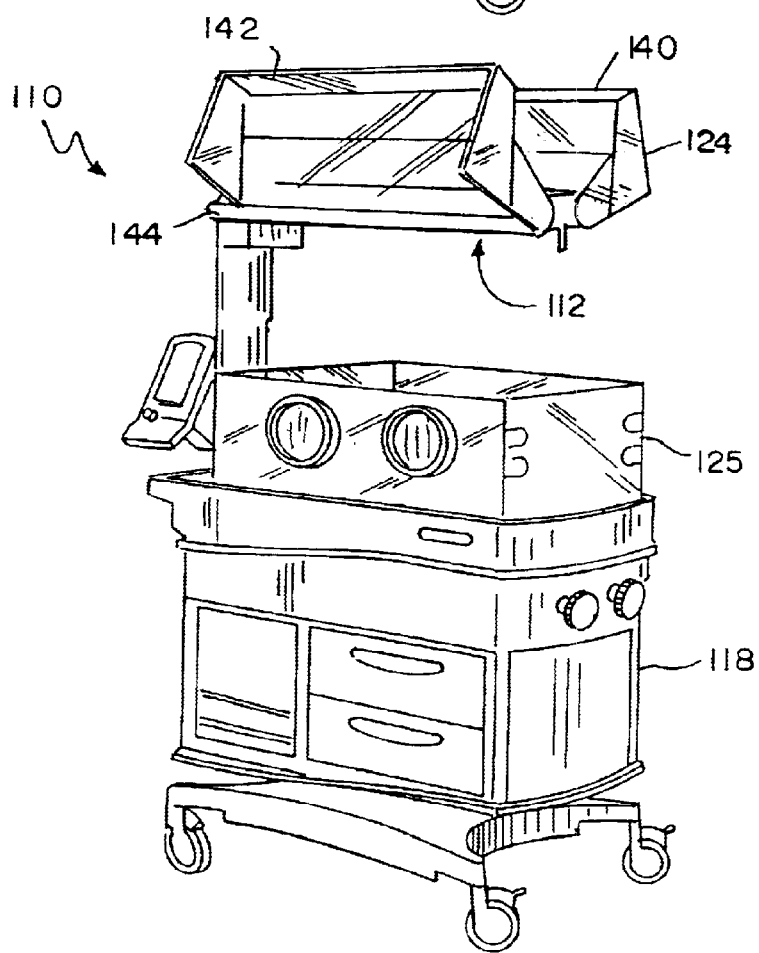
FIG. 2 is a perspective view of the support of FIG. 1 in an open configuration conducive to operation of the support in warmer configuration.
Figure 3:
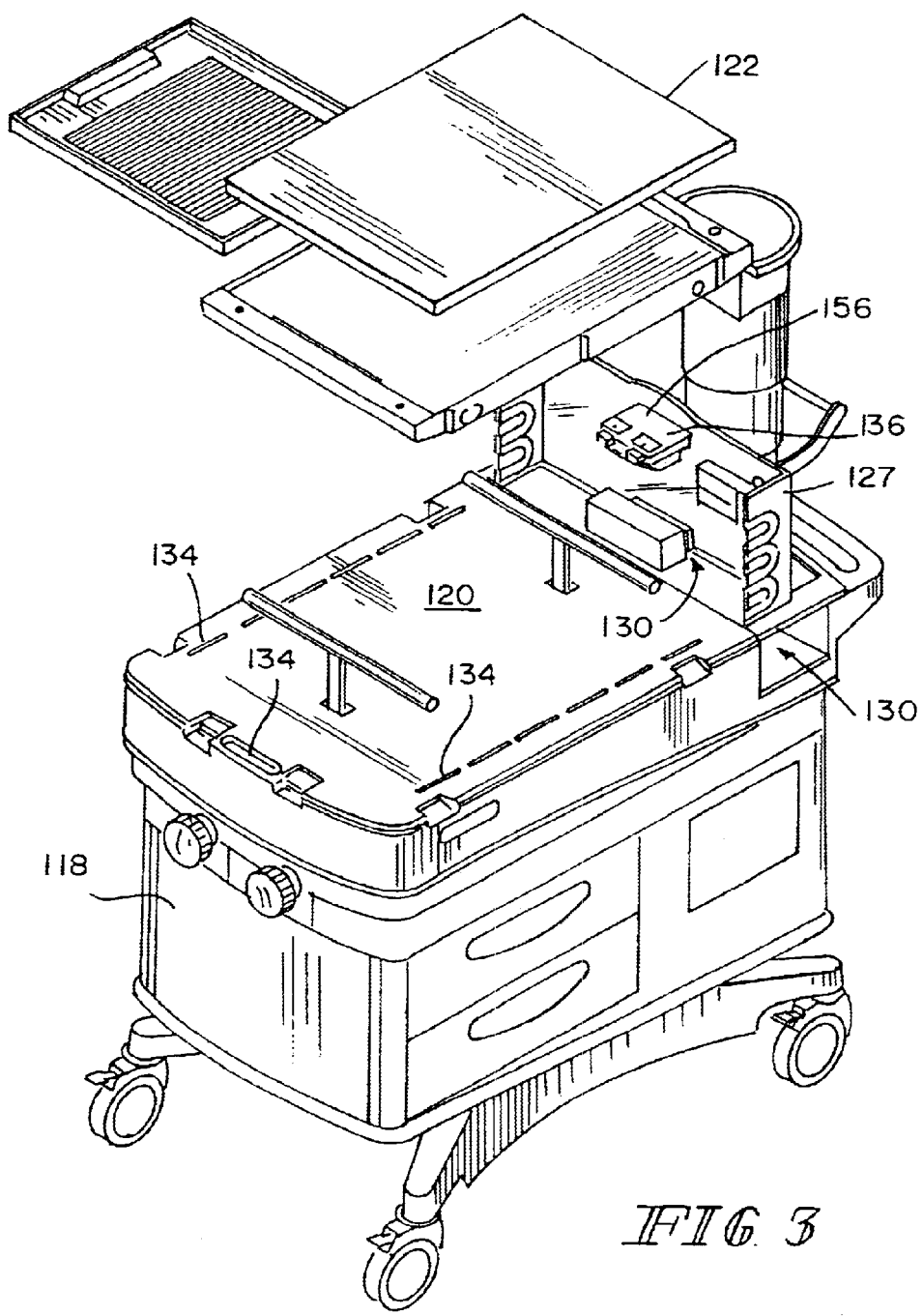
FIG. 3 is a perspective view with parts broken away of the support of FIG. 1 showing a platform assembly supporting a deck, a fixed wall and a mattress supported on a mattress tray.
Figure 4:
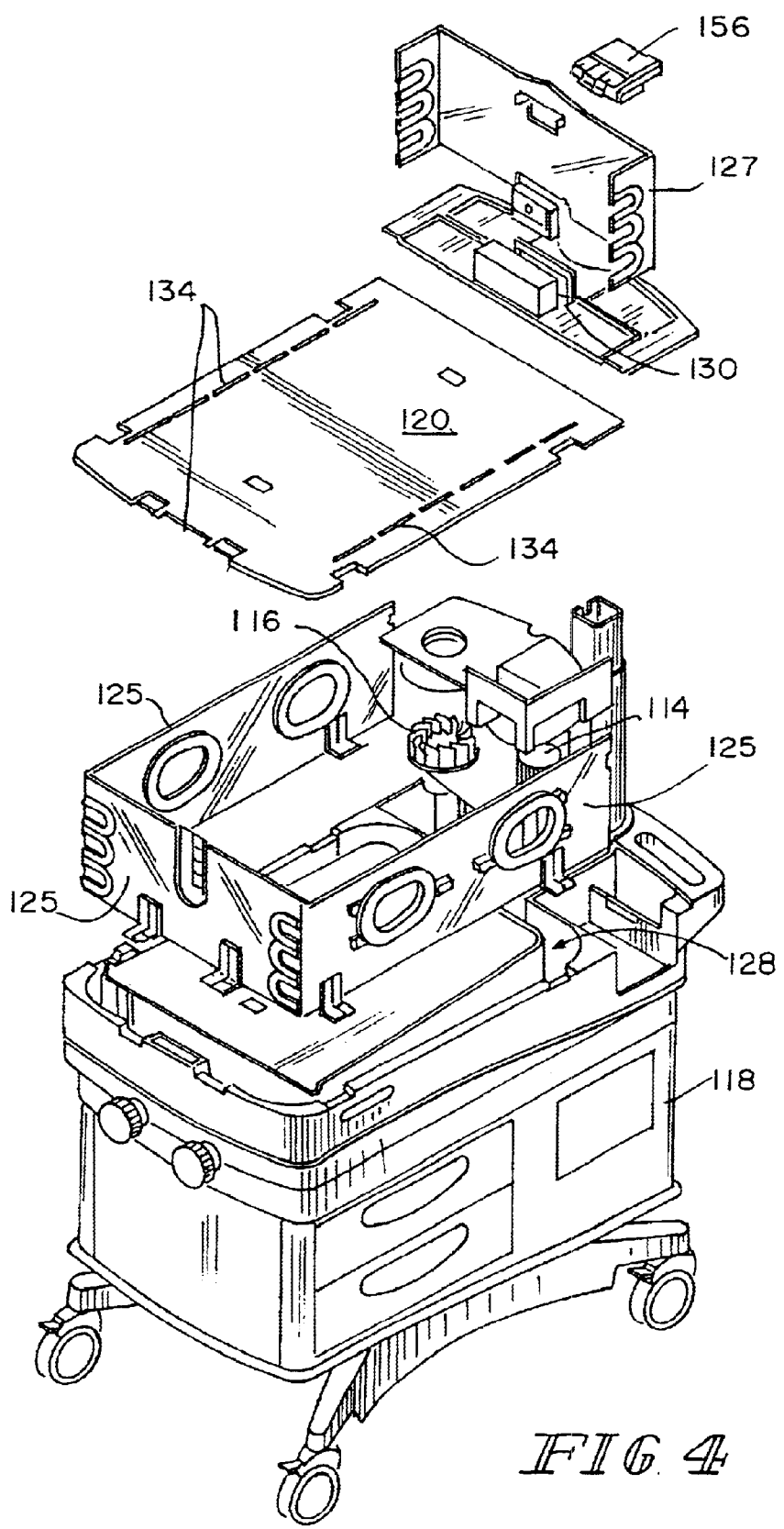
FIG. 4 is a partial exploded view of a portion of the support of FIG. 1 showing a platform assembly supporting a deck, a fixed wall configured to receive a sensor module and hinged walls and also showing a blower and a convective heater located within duct work below the support surface.
Figure 5:
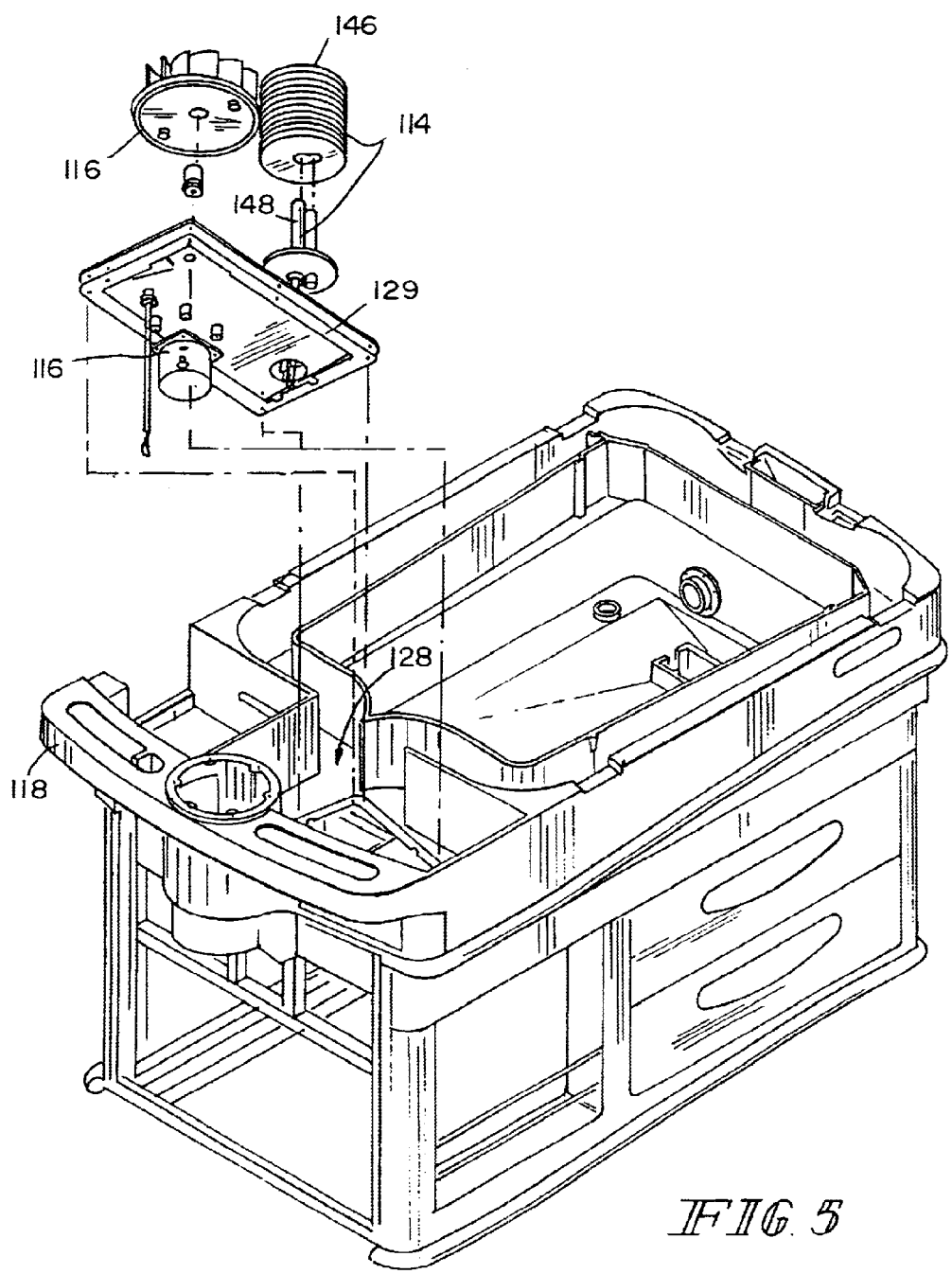
FIG. 5 is a partial exploded view of a portion of the support of FIG. 1 showing below deck surfaces, a convective heater, a blower, and duct work for circulating air into the enclosure.
Figure 1:
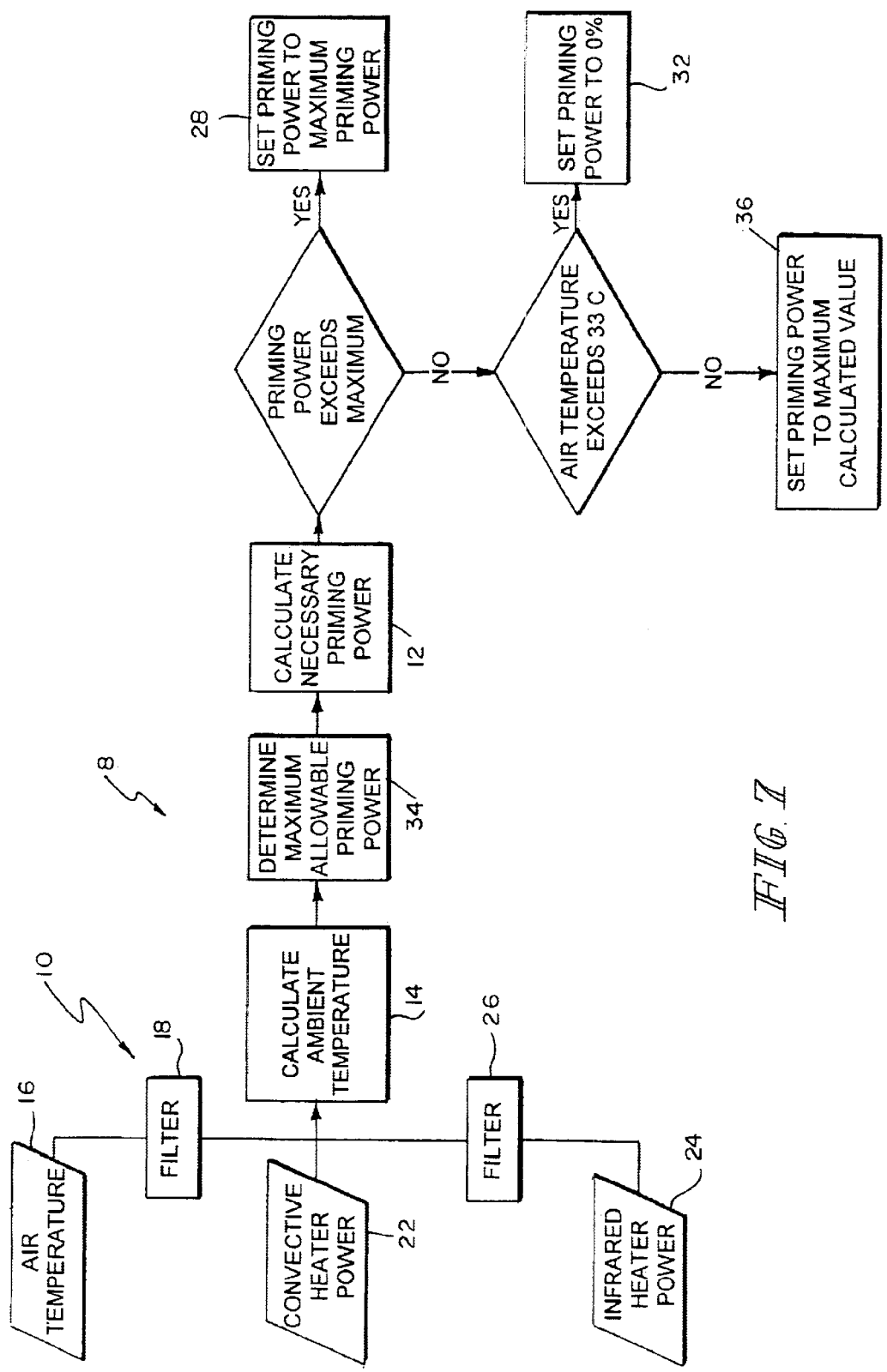

Incubator/warmer 110 is adapted to assume a warmer configuration, as shown, for example, in FIG. 2, and an incubator configuration, as shown, for example, in FIG. 1, and to transition between the two configurations. In the incubator configuration, walls 125, 127 and canopy 124 are configured to form an enclosure 126 surrounding infant support surface 120. Incubator/warmer 110 includes a plurality of hinged walls and hinged wall panels 125 and a fixed wall 127 the edges of which abut edges of adjacent walls or adjacent wall panels and bottom surfaces of canopy 124 when in the incubator configuration to form the enclosure 126. Walls 125 and 127 are formed to include a plurality of access ports through which a caregiver can have limited access to infant 123 without compromising the integrity of the enclosure 126. Hinged wall panels 125 form doors which may be opened when incubator/warmer 110 is in the incubator configuration to provide greater access to infant 123 in enclosure 126. Incubator/warmer 110 may be provided with entraining curtains of air flowing past doors to reduce loss of heated air while the door is opened. Walls 125 are also configured to fold into a retracted position permitting substantially less restricted access by a caregiver to infant 123 on mattress 122 when incubator/warmer 110 is in warmer configuration. When in warmer configuration canopy 124 is positioned to allow infrared radiation from infrared warmer 112 to impinge upon support surface 120 and infant 123 located on mattress 122. Illustratively, canopy 124 includes two canopy half portions 140, 142 hingedly mounted to an overhead arm assembly 144.

It is further contemplated that the infant support 110 may include supplemental heaters, heat reservoirs, ambient temperature sensors, outlet port sensors, head panel sensors, and heat reservoir sensors to provide closed-loop feedback.

When in incubator configuration, blower 116 pulls air from the interior, and sometimes the exterior, of the enclosure 126 through air intakes 130. This air is pulled through inlet portions of duct work 128 and across convective ribs 146 thermally coupled to heating element 148 of conductive heater 114 resulting in convective heating of the air. The air is then forced through outlet portions of the duct work 128 to be expelled through orifices 134 into the interior of enclosure 126. After passing over convective ribs 146 there is some heat transfer between the warmed air and below deck surfaces of duct work 128 and incubator/warmer 110. During start-up this heat transfer to below deck surfaces continues until below deck surfaces of duct work 128 are warmed to a temperature approaching that of the heated air. Eventually, heat transfer between the warmed air and below deck surfaces is reduced.

In normal incubator mode, the temperature of infant 123 within enclosure 126 is controlled by regulating the power to the convective heater 114, speed of the blower 116 or controlling both the power to the convective heater 114 and the speed of the blower 116. In the illustrated embodiment of incubator/warmer 110, convective heater power and blower speed may be controlled using various algorithms implemented by a microprocessor 150. Heater power and blower speed may be controlled by using open loop control implementing algorithms based on certain conditions (e.g. a pre-heat mode or door open mode) or by using closed loop control based on digital feed back received from air temperature sensor 136, skin temperature sensor 138 or from both air temperature sensor 136 and skin temperature sensor 138. Open loop control systems to facilitate preheating of an incubator prior to use or for minimizing heat loss when incubator doors are opened are known and are therefore not described in this application. Closed loop controls for controlling the convective heater of an incubator or incubator/warmer 110 during normal incubator mode are also known. All of the power control algorithms mentioned herein use pulse width modulation 152 of the power to the controlled heater 112, 114 to regulate power between 0 and 100% of the available power from the heater power supply 154.

For purposes of discussion, the following stages are defined for facilitating warmer to incubator transition.

Priming Stage—The time spent, before transition, heating the below-deck volume and surfaces while the system remains in a warmer configuration.

Infusion Stage—The initial transfer of heat from the below-deck volume and surfaces into the enclosure 126, which begins when incubator configuration is attained.

Convergence Stage—The time from the end of the predominance of thermal infusion to the time when the air temperature is in the neighborhood of the target air temperature.

In the presently preferred embodiment, when closed loop control of convective heater 114 is implemented in post convergence stage, the microprocessor 150 of incubator/warmer 110 implements a first order PID convective heater controller when the feed back is based on air temperature alone and a dual hierarchy PID convective heater controller when the feed back includes skin temperature information. In skin control mode, the dual hierarchy PID controlled pulse width modulator regulates the percent of line power provided for convective heater operation. The dual hierarchy PID controller provides a scaled signal between 0 and 1 to regulate the duty cycle of the PWM 152 between 0 and 100%. The dual hierarchy PID controller receives skin temperature signals from skin temperature sensor 138, air temperature signals from air temperature sensor 136 in sensor module 156, and a skin temperature set point 158 entered through the caregiver interface 160. The dual hierarchy PID controller includes a first stage proportional-integral (PI) controller and a second stage proportional-differential (PD) controller. The error signal for the first stage PI controller is obtained by comparing the skin temperature to the skin temperature set point. The output of the first stage PI controller is used as the air temperature set point. Thus the error signal for the second stage PD controller is obtained by comparing the PI generated air temperature set point to the air temperature.

Figure 8:
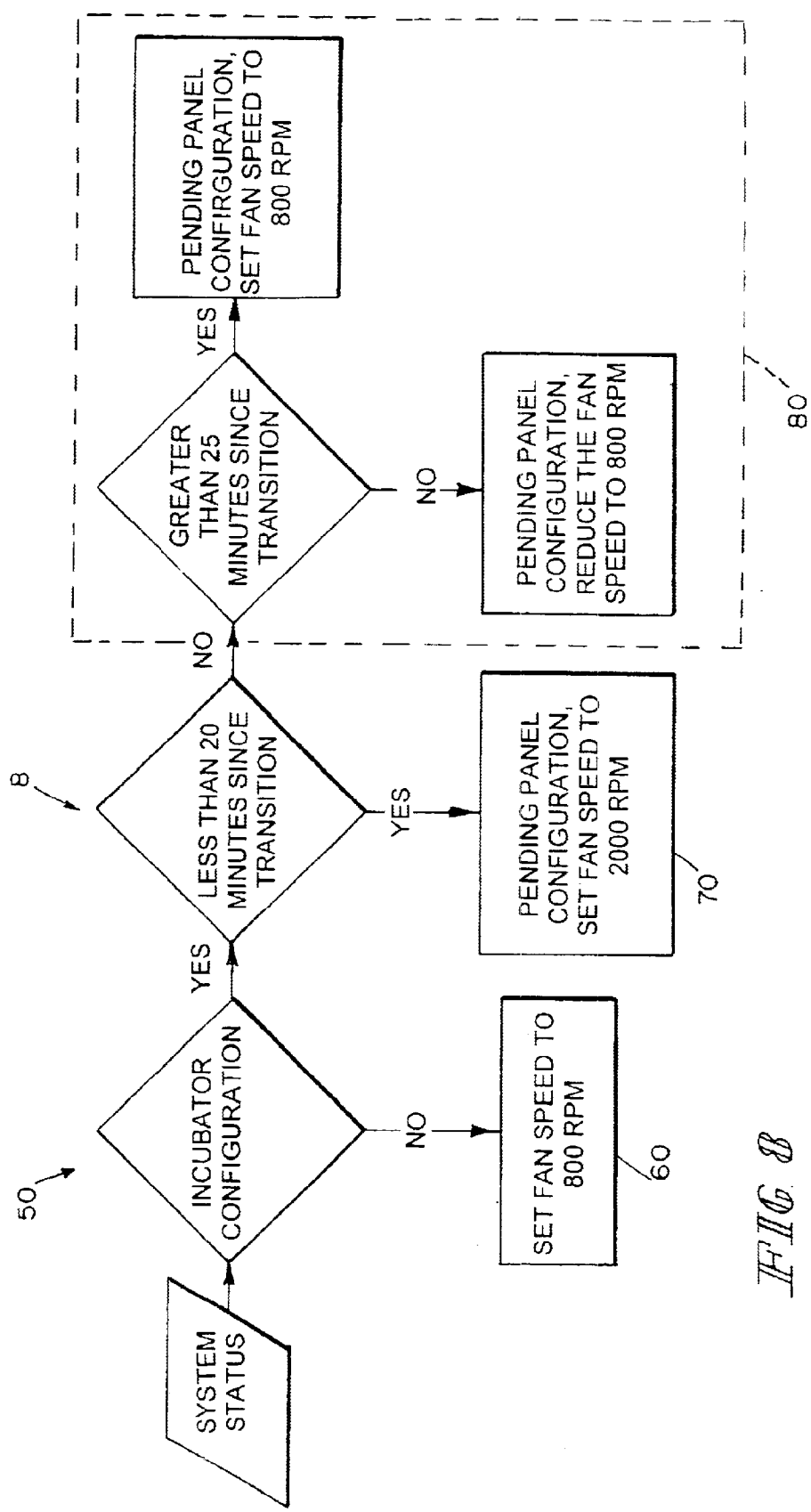
FIG. 8 is a flow diagram of the algorithm for determining the convective heater control algorithm after transition from warmer to incubator configuration.
Figure 9:
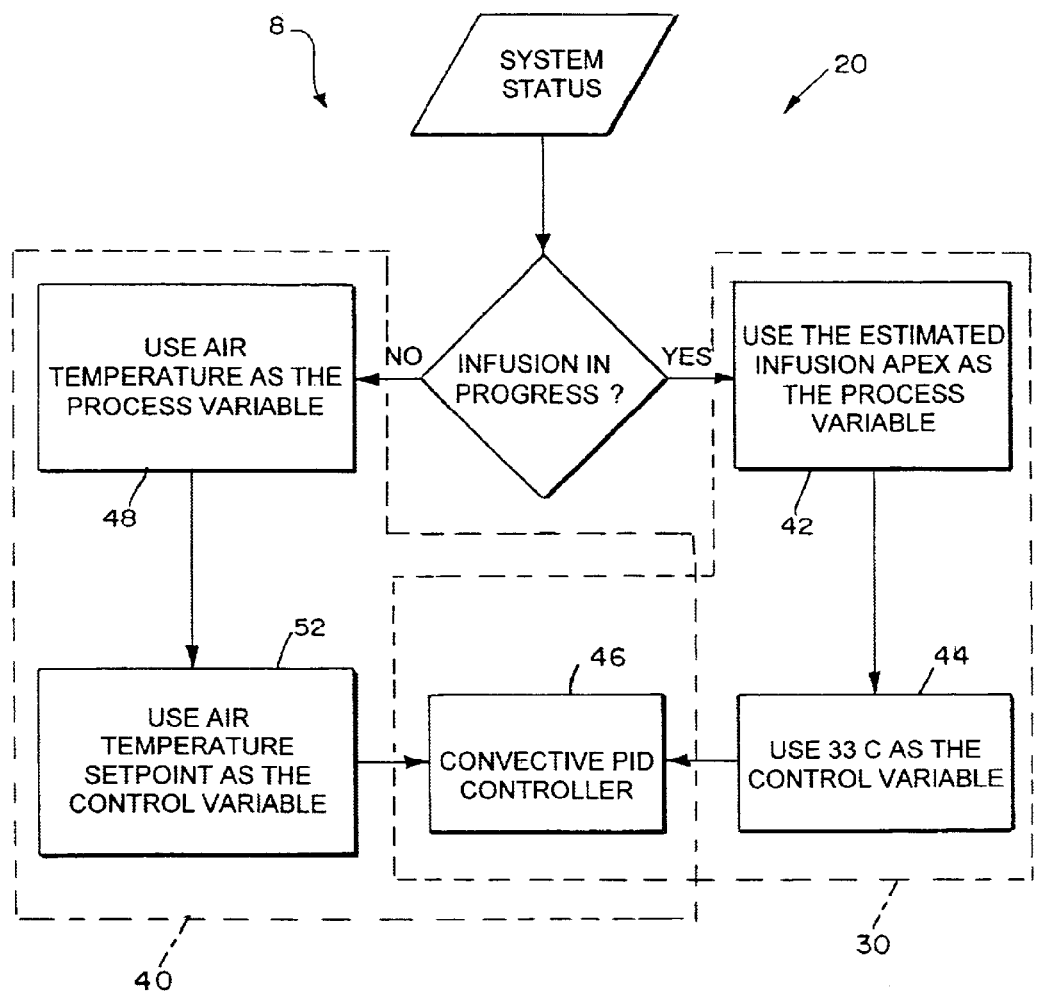
FIG. 9 is a flow diagram of a blower speed control algorithm.

In order to rapidly obtain steady state temperature control of infant 123 in enclosure 126, the disclosed embodiment of infant support thermal control system 8 operates different control algorithms in different stages of operation prior to and after transition from warmer configuration to incubator configuration. As shown in FIGS. 7–9, infant support thermal control system 8 includes a priming stage convective heater control 10, a post transition PID convective heater controller 20 including an infusion stage PID convective heater controller 30 and a convergence stage PID convective heater controller 40, and a blower controller 50 that controls the blower speed during priming, infusion, and convergence stages. While still in warmer configuration, incubator/warmer 110 uses a priming stage control algorithm 10 and 60 to heat the below deck volume and surfaces. This priming stage control algorithm 10 and 60 regulates convective heater 114 and blower 116 until canopy 124 is in incubator configuration forming an enclosure 126 around infant 123 on the support surface 120. After the canopy 124 has assumed the incubator configuration, incubator/warmer 110 operates an infusion stage control algorithm 30 and 70. After most of the heat energy has been transferred from the below deck heat reservoir to the air within enclosure 126, incubator/warmer 110 runs a convergence stage control algorithm 40 and 70 until the air temperature in the enclosure 126 is in the neighborhood of the air temperature set point 162 entered through caregiver interface 160. Once the air temperature in the enclosure 126 is in the neighborhood of the air temperature set point 162, the incubator/warmer 110 converts to using known incubator algorithms to control the blower 116 and convective heater 114.

During transition from incubator configuration to warmer configuration, incubator/warmer 110 continues to run the control algorithm used in incubator mode immediately prior to the transition. In the illustrated embodiment, upon reaching warmer configuration, incubator/warmer 110 begins to run priming stage control algorithm 10 and 60 to control power to convective heater 114 and blower 116, while radiant heater power is controlled using a closed loop PID control based on the error between the skin temperature signal and a skin temperature set point 158.

As shown for example in FIGS. 7 and 9, in radiant warmer configuration, priming stage control algorithm 10 and 60 is implemented using priming stage convective heater control 10 and blower control 50. Priming stage control algorithm 10 and 60 controls the power to convective heater 114 between 0–100% of line power and the speed of blower 116 in priming stage to heat the below deck surfaces of incubator/warmer 110 to maintain a heat reservoir from which thermal energy may be drawn upon transition from warmer configuration to incubator configuration. Thus, in the illustrated embodiment, convective heater 114 and blower 116 continue to operate when incubator/warmer 110 is in warmer configuration. Because there is no enclosure 126 surrounding infant support surface 120, air warmed by convective heater 114 is discharged into the room 132 in which incubator/warmer 110 is located. As shown for example, in FIG. 9, to minimize the discharge of warmed air, blower speed is reduced to a speed slightly above blower stall speed. In the illustrated embodiment, blower speed is maintained at a constant level during warmer mode. In the illustrated embodiment priming stage blower speed control algorithm 60 maintains blower speed at a constant speed such as 800 RPM throughout priming stage, as shown in FIG. 9.

While blower speed is illustratively maintained at a constant level during priming stage, as shown in FIG. 9, power to convective heater 114 is not, as shown in FIG. 7. Rather power to convective heater 114 is illustratively controlled by calculating the power requirements 12 to generate a heat reservoir sufficient to rapidly return the air in enclosure 126 to near the temperature set point following transition to incubator configuration. The size of the heat reservoir (and thus the power to convective heater required to generate such heat reservoir) is dependent on the difference between the air temperature set point 162 and the ambient temperature. As shown, for example in FIG. 7, ambient temperature is calculated 14 using the values of the air temperature 16 which is filtered 18, the convective heater power 22 and the infrared heater power 24 which is also filtered 26 as described hereafter.

Ideally, the size of the heat reservoir will be sufficient that upon infusion of the heat from the heat reservoir, the temperature in the enclosure 126 will be equal to the set point temperature 162. However, under certain conditions, generating the ideal size of heat reservoir would require providing convective heater 114 with more power than it is designed to receive, exhausting air at too high of a temperature from the orifices 134, or overheating the below deck surfaces. Thus the priming stage convective heater control algorithm 10 is bounded to prevent such occurrences. As shown, for example, in FIG. 7, the two illustrated bounds on the priming stage control algorithm are 1) limiting the maximum power to the convective heater 114 to an amount that will not allow the temperature of the air exiting the orifices 134 to exceed 40° C. 28, and 2) eliminating additional heating when the sensed air temperature exceeds 33° C. 32.

The power to convective heater 114 determines the size of the heat reservoir being stored. In order to rapidly transition from warmer configuration to incubator configuration, the capacity of the heat reservoir is controlled as a function of the difference between the ambient temperature and the set point temperature 162 to be reached in incubator mode. Thus, during the priming stage, the power to convective heater 114 is controlled based on the difference between ambient temperature and the set point temperature 162. As the difference between ambient temperature and the set point temperature 162 increases, more heat must be stored in order to rapidly transition between warmer and incubator configurations and therefore primer algorithm increases the power to convective heater 114. Thus proper control of power to convective heater 114 in priming stage requires that the ambient temperature be determined 14.

The illustrated embodiment of incubator/warmer 110 includes sensors 136, 138 providing signals indicative of air temperature 16 entering a sensor module 156 and infant skin temperature but no sensor for ambient room temperature. In warmer configuration, the temperature of air entering sensor module 156 is not the ambient temperature. The temperature of the air entering sensor module 156 is influenced, to varying degrees by multiple parameters. The controller 8 disclosed herein implements an algorithm 14 to estimate the ambient temperature based on the air temperature 16 sensed by air temperature sensor 136 in sensor module 156. The algorithm assumes that infrared heater power 24 and convective heater power 22 are the two parameters which have the greatest influence on the difference between the air temperature sensed 16 by t air temperature sensor 136 in sensor module 156 and the ambient temperature. It is assumed that the ambient air temperature $T_A$ is linearly related to the parameters air temperature $T_a$ 16, infrared heater power $P_I$ 24, and priming power or convective heater power $P_P$ 22. The following discussion indicates the assumptions made in implementing the priming stage convective heater control algorithm 10.

One assumption is that by knowing certain parameters, ambient temperature can be calculated 14. The air temperature 16, read by air temperature sensor 136 in sensor module 156 while in warmer configuration, is a function of the ambient temperature, the infrared heater power 24 and convective heater power 22, prime time, the panel configuration, sunlight, building ventilation, the topology, reflectivity and radiation of the infant, the temperature of the mattress and objects on the mattress, and numerous other factors, including care giver activities around and with the infant support 110. Only a few of these parameters are measured or controlled.

As previously mentioned in implementing the illustrated control system 8, it is further presumed that the effects of most of these factors are small or negligible. However, those skilled in the art will recognize that the methodology explained herein can be extended to include other parameters within the implementation of the control system within the scope of the disclosure. In the illustrated control system 8, the factors that are considered to affect the air temperature reading 16 are the infrared heater power 24 and convective heater power 22, the ambient temperature, the prime time, and the side panel position. The prime time and side panel configuration are considered constants in the illustrated implementation of priming stage convective heater control algorithm 10.

Empirical data suggests that a linear approximation can be reasonably used to quantify the relationship of the air temperature reading 16 to each variable independently. Furthermore, the data supports the generalization that this property applies to any pair of these factors. It is presumed that one of these factors can be expressed as some function of the others:

$$R=f(x, y, z).$$

Since the relationship between R and each variable is known and is essentially linear, it can be written as:

$$R=m_0(y, z)x+b_0(y, z).$$

Applying the same logic obtains:

$$R=[m_1(z)y+b_1(z)]x+m_2(z)y+b_2(z).$$

Performing this operation again, obtains:

$$R=[(m_3z+b_3)y+(m_4z+b_4)]x+(m_5z+b_5)y+(m_6z+b_6).$$

This can be rewritten in the general form:

$$R=k_7xyz+k_6xy+k_5xz+k_4yz+k_3x+k_2y+k_1z+k_0 \qquad \text{Equation 1}$$

Where $k_7$, $k_6$, $k_5$, $k_4$, $k_3$, $k_2$, $k_1$, and $k_0$ are constants the values of which can be determined through calibration.

While the illustrated embodiment considers four parameters as being linearly related, those skilled in the art will recognize that additionally parameters can be considered in implementing a control system by extension of the above identified mathematical approach.

In the illustrated embodiment each system parameter is either measured or calculated as described below. The air temperature sensor 136 in sensor module 156 in warmer, transition and incubator configurations measures the air temperature 16. The infrared heater power 24 is set by the infrared skin temperature PID controller, the pre-warm timer sequence, or by manual input from the care giver. The presently illustrated embodiment does not include an ambient air temperature sensor and thus calculates the ambient air temperature 14 based upon its linear relationship with air temperature 16, convective heater power 22, and infra-red heater power 24. It is within the scope of the disclosure to measure ambient temperature directly with an infant support warmer temperature sensor interface and thereby eliminate the need for linear approximation of ambient temperature 14. Until the infant support warmer temperature sensor interface is implemented and filtered for thermal artifact, ambient temperature must be derived 14 from the general form. Thus, the ambient temperature, $T_A$, may be written as follows:

$$T_A \cong a_7 T_a P_I P_P + a_6 T_a P_I + a_5 T_a P_P + a_4 P_I P_P + a_3 T_a + a_2 P_I + a_1 P_P \quad \text{Equation 2}$$

Where, $T_A$ is the ambient temperature, $T_a$ is the air temperature, $P_I$ is the infrared heater power, $P_P$ is the convective priming power and $a_7$, $a_6$, $a_5$, $a_4$, $a_3$, $a_2$, $a_1$ and $a_0$ are experimentally derived constants. The values of the derived constants are determined during calibration of the incubator/warmer 110. Those skilled in the art will recognize that various calibration techniques may be used to determine the value of the derived constants. In the illustrated embodiment $a_7$, $a_6$, $a_5$, $a_4$, $a_3$, $a_2$, $a_1$ and $a_0$ are derived experimentally from eight measurements of $T_A$, $T_a$, $P_P$ and $P_I$ using a Gaussian elimination method.

In order to calculate priming power 12, a term used for the power to the convective heater 114 when in the priming mode, the priming stage convective heater control system 10 implemented in the disclosed embodiment considers the temperature differential between ambient temperature and the desired temperature 162 within the incubator upon return to incubator configuration. The temperature change $\Delta T$ that occurs at the transition without post-transition supplemental heat is calculated as:

$$\Delta T = T_{Max} - T_a \quad \text{Equation 3}$$

Where, $\Delta T$ is the temperature change caused by the thermal infusion, $T_{Max}$ is the maximum air temperature induced by the thermal infusion, and $T_a$ is the air temperature. Thus, the air temperature differential may be written as follows:

$$\Delta T \cong b_7 T_A P_I P_P + b_6 T_A P_I + b_5 T_A P_P + b_4 P_I P_P + b_3 T_A + b_2 P_I + b_1 P_P \quad \text{Equation 4}$$

Where, $\Delta T$ is the temperature change caused by the thermal infusion, $T_A$ is the ambient temperature, $P_I$ is the infrared heater power and $P_P$ is the convective priming power. $b_7$, $b_6$, $b_5$, $b_4$, $b_3$, $b_2$, $b_1$ and $b_0$ are experimentally derived constants which are derived experimentally from eight measurements of $T_A$, $T_a$, $P_P$ and $P_I$ and a Gaussian elimination.

The convective priming power requirement may be derived similarly using the difference between the targeted air temperature set point 162, e.g., 33° C., and the air temperature. This is denoted as:

$$\Delta T_T = T_T - T_a \quad \text{Equation 5}$$

Where, $\Delta T_T$ is the temperature change desired by the thermal infusion, $T_T$ is the targeted air temperature set point and $T_a$ is the air temperature. The priming power required to cause a heat infusion of the required magnitude may then be approximated as follows:

$$P_P \cong c_7 T_A \Delta T_T P_I + c_6 T_A \Delta T_T + c_5 T_A P_I + c_4 \Delta T_T P_I + c_3 T_A + c_2 \Delta T_T + c_1 P_I + c_0 \quad \text{Equation 6}$$

Where, $P_P$ is the priming power, $T_A$ is the ambient temperature, $\Delta T_T$ is the temperature change desired by the thermal infusion and $P_I$ is the infrared heater power. $c_7$, $c_6$, $c_5$, $c_4$, $c_3$, $c_2$, $c_1$ and $c_0$ are experimentally derived constants derived experimentally from eight measurements of $T_A$, $T_a$, $P_P$ and $P_I$ and a Gaussian elimination.

Illustratively, the air temperature at the convective outlet ports 134 shall not exceed 40° C. This will be the limiting factor for priming power.

Since the relationship between ambient temperature, heater power and outlet port temperature is known to be linear, it may be written as follows:

$$k_2 P_P + k_1 T_A + k_0 = T_o \quad \text{Equation 7}$$

Where, $P_P$ is the priming power, $T_A$ is the ambient temperature, $T_o$ is the air temperature in warmer configuration and $k_2$, $k_1$ and $k_0$ are constants. It is contemplated that $k_2$, $k_1$ and $k_0$ may be derived from three measurements of $T_A$, $T_o$ and $P_P$ and a substitution method. Substituting a maximum outlet port temperature of $T_o$=40° C., Equation 7 can be simplified and written as follows:

$$P_{PMax} = d_1 T_A + d_0 \quad \text{Equation 8}$$

Where, $P_{PMax}$ is the maximum allowable priming power that meets the specification, $T_A$ is the ambient temperature and $d_1$ and $d_0$ are experimentally derived constants. It is contemplated that $d_1$ and $d_0$ may be derived from two measurements of $T_A$ and $P_P$ and a substitution method.

Due to the nature of an air temperature measurement in warmer configuration and infrared heater power outputs, both signals are discretely conditioned using a heavy infinite impulse response filter 18 and 26, respectively. The air temperature filter 18 is implemented using the following model:

$$T_w(t) = \alpha_0 T_w(t-1) + \beta_0 T_a(t) \quad \text{Equation 9}$$

Where, $T_w(t)$ is the current filtered air temperature in warmer configuration, $T_w(t-1)$ is the last filtered air temperature in warmer configuration, $T_a(t)$ is the current unfiltered air temperature in warmer configuration and $\alpha_0$ and $\beta_0$ are constants. Similarly, the infrared heater power filter 26 is implemented using the following model:

$$P_I(t) = \alpha_1 P_I(t-1) + \beta_1 P_{IR}(t) \quad \text{Equation 10}$$

Where, $P_I(t)$ is the current filtered infrared heater power, $P_I(t-1)$ is the last filtered infrared heater power, $P_{IR}(t)$ is the current unfiltered infrared heater power and $\alpha_1$ and $\beta_1$ are constants. The value of the above constants are determined through calibration.

Priming stage convective heater control algorithm 10 is implemented using a microprocessor receiving signals indicative of air temperature 16, convective heater power 22, and radiant heater power 24. As shown for example, in FIG. 7, priming stage convective heater control algorithm 10 is as follows:

The ambient temperature is calculated 14 using Equation 2 and priming power from the previous iteration and the filtered infrared heater power and filtered air temperature values.

$$T_A = a_7 T_w(t) P_I(t) P_P + a_6 T_w(t) P_I(t) + a_5 T_w(t) P_P + a_4 P_I(t) P_P + a_3 T_w(t) + a_2 P_I(t) + a_1 P_P + a_0$$

The maximum allowable priming power is calculated 34 using Equation 8.

$$P_{PMax}=d_1T_A+d_0$$

If the initial air temperature in warmer configuration exceeds the target temperature, shown illustratively as 33° C. the priming power is set to zero 32.

$$T_a \geq T_T \rightarrow P_P = 0\%$$

Otherwise, the priming power required is calculated 12 using Equation 6 using the calculated value of ambient temperature 14 and the filtered infrared heater power and air temperature signals.

$$P_P=c_7T_A(T_T-T_w(t))P_I(t)+c_6T_A(T_T-T_w(t))+c_5T_AP_I(t)+$$
$$c_4(T_T-T_w(t))P_I(t)+c_3T_A+c_2(T_T-T_w(t))+c_1P_I(t)+c_0$$

If priming power required exceeds the 40° C. outlet requirement, then the power to the convective heater is limited to the maximum allowable priming power 28.

$$P_P > P_{PMax} \rightarrow P_P = P_{PMax}$$

Otherwise, the priming power is set to the maximum calculated priming power 36.

The priming stage control algorithm 10 and 60 is implemented by the control system 8 until infant support 110 is configured for incubator mode. In the illustrated embodiment, the priming stage control algorithm 10 and 60 is described as functioning from the moment infant support 110 assumes warmer configuration until infant support 110 assumes incubator configuration, however, those skilled in the art will recognize that continuous operation of priming stage control algorithm is not required. Also, the illustrated embodiment considers that the air flow rate and panel configurations during priming stage will be held constant. It is within the teaching of the disclosure for priming stage control algorithm 10 and 60 to be modified to accommodate changes in air flow rate and panel configurations.

As incubator/warmer 110 begins reconfiguration from warmer configuration to incubator configuration, power to the infrared heater 112 is terminated. The last infrared power reading is stored for use during infusion stage and for the continued operation of priming stage algorithm 10 and 60 until incubator/warmer 110 assumes incubator configuration. Once incubator/warmer 110 assumes incubator configuration, priming stage control algorithm 10 and 60 ceases to control convective heater power and blower speed and convective heater power and blower speed are controlled by infusion stage algorithm 30 and 70 which implements a modified PID controller.

During normal incubator operation stage, the power to convective heater 114 is controlled using a PID controller. During this stage the convective PID controller error is the difference between the targeted air temperature set point 162 and the air temperature. This can be written as:

$$\epsilon = T_T - T_a. \quad \text{Equation 12}$$

Where, $\epsilon$ is convective PID error, $T_T$ is the targeted air temperature set point 162, and $T_a$ is the air temperature.
During the post-transition infusion period, the infusion stage convective heater control algorithm 30 illustratively sets the convective PID controller error to the difference between the targeted air temperature set point 162 and the estimated air temperature at the end of the thermal infusion 42 using 33° C. as the control variable for air temperature set point 44. This modified transition error is represented as:

$$\epsilon_T = T_T - (T_a - \Delta T). \quad \text{Equation 12}$$

Where, $\epsilon_T$ is convective PID error, $T_T$ is the targeted air temperature set point 162, $T_a$ is the air temperature and $\Delta T$ is the temperature change caused by the thermal infusion.

In the illustrated embodiment, infusion convective heater control algorithm 30 controls convective heater power for a set period, illustratively one minute, following transition to incubator configuration. Those skilled in the art will recognize that it is within the scope of the disclosure for the duration of infusion stage to be increased or decreased.

In the illustrated embodiment, immediately upon transition from warmer configuration to incubator configuration, the blower speed is increased 70 to increase the air flow. Illustratively, blower speed is increased to 2000 RPM 70 for twenty minutes following the transition. The increased air flow facilitates stabilization of the temperature of infant 123 within the enclosure 126. Thus, in the illustrated embodiment, blower speed is increased during the infusion stage and the convergence stage. After completion of the high air flow duration, blower speed is ramped down to the level determined by normal incubator mode controller. It is within the scope of the disclosure for the air flow rate to be increased by a greater or lesser amount and for a shorter or longer duration.

During both infusion stage and convergence stage, convective heater power is regulated using a PID controller 46. The control system 8 consists of a pre-transition algorithm, the priming stage algorithm 10 and 60, to control the thermal infusion, and post-transition algorithms that relinquishes control to the convective PID without negatively interfering with the infusion. As shown for example in FIG. 8, during infusion stage, the PID error is adapted 42 to compensate for anticipated thermal infusion. Thus, the anticipated temperature change that will be caused by the thermal infusion is calculated using Equation 4 using the last calculated ambient temperature reading 14, convective heater power reading 22 and filtered infrared heater power reading 26 from the priming stage.

$$\Delta T=b_7T_AP_I(t)P_P+b_6T_AP_I(t)+b_5T_AP_P+b_4P_I(t)P_P+b_3T_A+b_2P_I(t)+$$
$$b_1P_P+b_0$$

During the infusion duration, the convective PID controller error is set to $\epsilon_T$, using Equation 12.

$$\epsilon_T = T_T - (T_a - \Delta T)$$

Illustratively, after one minute, the illustrated duration of infusion stage, convergence stage convective heater algorithm 40 begins to control the power to convective heater. During convergence stage, convective PID controller 46 error is set to $\epsilon$, using Equation 11.

$$\epsilon = T_T - T_a$$

so that air temperature is used as the process variable 48 and the air temperature set point is used as the control variable 52.

It is envisioned that as the air temperature in the enclosure 126 begins to stabilize the temperature of infant 123, the proportional gain, integral gain, and derivative gains of the PID controller may be adjusted to further facilitate stabilization of the infant.

Upon the expiration of this high airflow time, and barring intervention by the care giver, the blower speed proportionally decays back to the normal steady state blower speed of 800 rpm 80.

Air temperature sensor 136 and skin temperature sensor 138 are of the type commonly available for use in medical equipment. In the illustrated device, signals from air temperature sensor 136 and skin temperature sensor 138 are received by a microprocessor 150 which implements the various filters and control algorithms. Most skin temperature sensors and air temperature sensors provide an analog signal indicative of the parameter being sensed, while most microprocessors manipulate digitized information. Those skilled in the art will recognize that air temperature sensor 136 and skin temperature sensor 138 may be digital sensors or may be analog sensors acting in conjunction with analog to digital converters within the scope of the disclosure.

In the illustrated embodiment, incubator/warmer 110 includes a microprocessor 150 which runs algorithms implementing the described filters, controllers, and pulse width modulators based on digitized air temperature and skin temperature signals. Microprocessor 150 calculates the ambient temperature and stores values of prior infrared heater power, infrared heater error signals, convective heater error signals, and ambient air temperature readings to allow for appropriate filtering of signals and implementation of the integral and proportional components of the various controllers. It is within the scope of the disclosure for the control algorithms, storage functions and controllers to be implemented using discrete components and or integrated circuits rather than a microprocessor.

Experimental data showing the rate at which the environment of the infant support increases in temperature indicates that the infant skin temperature is maintained through transition within a ±1° C. band and returns to a neighborhood of the set point temperature within 20 minutes.

For precision control, those skilled in the art will recognize that infant support 110 may include supplemental heaters and heat reservoirs, ambient temperature sensors, outlet port sensors, head panel sensors, heat reservoir sensors and a closed-loop blower controller within the scope of the disclosure. Those skilled in the art will recognize that while the description has focused on an incubator/warmer, the teachings of this disclosure have applicability to any infant support having an open configuration and a closed configuration in which an enclosure is formed for receipt of an infant therein.

Although the invention has been described in detail with reference to specific embodiments, variations and modifications exist within the scope and spirit of the invention as described and defined in the following claims.

What is claimed is:

1. An incubator/warmer comprising:

an infant support, a canopy to provide an enclosure about the infant support and an infant residing on the support when the incubator/warmer is in an incubator configuration, the canopy being retractable to place incubator/warmer in a warmer configuration, a convective heater system comprising an air heater, a blower and passageways through which air is circulated by the blower to provide heated air to the enclosure, a radiant warmer positioned to warm the infant on the support when the canopy is retracted and the incubator/warmer is in the warmer configuration, and a control system configured to rapidly bring air in the enclosure to a target temperature when the incubator/warmer transitions from the warmer configuration to the incubator configuration, the control system comprising:

a priming stage algorithm that maintains air in the passageways of the convective heater system at a priming temperature by controlling power to the air heater and speed of the blower to operate the air heater and the blower while the incubator/warmer is in the warmer configuration; and an infusion stage algorithm that controls the blower to drive air from the passageways into the enclosure to rapidly warm the enclosure after transition of the incubator/warmer to the incubator configuration.

2. The incubator/warmer of claim 1 wherein the control system further comprises a convergence stage algorithm that controls the blower to drive warmed air into the enclosure until the target temperature is reached.

3. The incubator/warmer of claim 2 wherein the control system controls the blower to drive the air at a greater velocity during the infusion stage than during the convergence stage.

4. The incubator/warmer of claim 1 wherein the control system derives the priming temperature from the target temperature and a calculated ambient temperature while the incubator/warmer is in the warmer configuration.

5. The incubator/warmer of claim 1 wherein the priming stage algorithm controls the power to the air heater based on the power output of the radiant heater.

6. The incubator/warmer of claim 1 wherein priming stage algorithm controls the blower to operate at a speed near the stall speed of the blower.

7. The incubator/warmer of claim 1 further comprising an air temperature sensor electrically coupled to the control system, the air temperature sensor being positioned to be within the enclosure when the incubator/warmer is in the incubator configuration and exposed to ambient air when the incubator/warmer is in the warmer configuration.

8. The incubator/warmer of claim 7 wherein during the priming stage algorithm the control system derives the ambient temperature based on the temperature sensed by the air temperature sensor when the incubator/warmer is in the warmer configuration and controls the power to the air heater based on the ambient temperature.

9. The incubator warmer of claim 8 wherein during the priming stage algorithm the control system controls the power to the air heater based on the power being provided to the radiant heater.

10. The incubator/wanner of claim 8 wherein during the priming stage algorithm the control system controls the power to the air heater based on the power then being provided to the air heater.

11. The incubator/warmer of claim 10 wherein during the priming stage algorithm the control system controls the power to the air heater based on the power being provided to the radiant heater.

12. The incubator/warmer of claim 1 wherein during the priming stage algorithm a heat reservoir is generated by heating the passageways.

13. The incubator/warmer of claim 12 wherein during the infusion stage algorithm the control system controls the power to the air heater to compensate for heat which will be infused from the heat reservoir.

14. A control system for an infant support of the type capable of assuming and transiting between an incubator configuration wherein an enclosure is defined around an infant support surface and a warmer configuration, the infant support having a radiant heater supplied with power in the warmer configuration, a convective heater, a blower and duct work communicating with the enclosure, convective heater and blower, the control system comprising a convective heater controller controlling the power to the convective heater while the infant support is in the warmer configuration so as to prewarm portions of the duct work past which air to be infused into the enclosure will pass, and a blower controller controlling the power to the blower to provide a reduced air flow while the support is in the warmer configuration and to provide an increased air flow while the infant support is in the incubator configuration.

15. The control system of claim 14 wherein the convective heater controller controls the power to the convective heater prior to the infant support assuming the incubator configuration based on the ambient temperature of a room in which the infant support is located.

16. The control system of claim 15 wherein the convective heater controller controls the power to the convective heater prior to the infant support assuming the incubator configuration based on the power supplied to the radiant heater.

17. The control system of claim 16 wherein the convective heater controller controls the power to the convective heater prior to the infant support assuming the incubator configuration based on the current power to the convective heater.

18. The control system of claim 16 wherein the convective heater controller controls the power to the convective heater prior to the infant support assuming the incubator configuration so as to create a heat reservoir which may be infused into the enclosure upon the infant support assuming the incubator configuration.

19. The control system of claim 18 wherein the convective heater controller controls the power to the convective heater immediately after the infant support assumes the incubator configuration to compensate for heat which will be infused from the heat reservoir.

20. The control system of claim 15 wherein the convective heater controller controls the power to the convective heater prior to the infant support assuming the incubator configuration so as to create a heat reservoir which may be infused into the enclosure upon the infant support assuming the incubator configuration.

21. The control system of claim 20 wherein the convective heater controller controls the power to the convective heater immediately after the infant support assumes the incubator configuration to compensate for heat which will be infused from the heat reservoir.

22. The control system of claim 14 wherein the convective heater controller controls the power to the convective heater prior to the infant support assuming the incubator configuration based on the power supplied to the radiant heater.

23. The control system of claim 22 wherein the convective heater controller controls the power to the convective heater prior to the infant support assuming the incubator configuration based on the current power to the convective heater.

24. The control system of claim 22 wherein the convective heater controller controls the power to the convective heater prior to the infant support assuming the incubator configuration so as to create a heat reservoir which may be infused into the enclosure upon the infant support assuming the incubator configuration.

25. The control system of claim 24 wherein the convective heater controller controls the power to the convective heater immediately after the infant support assumes the incubator configuration to compensate for heat which will be infused from the heat reservoir.

26. The control system of claim 14 wherein the convective heater controller controls the power to the convective heater prior to the infant support assuming an incubator configuration based on the current power to the convective heater.

27. The control system of claim 26 wherein the convective heater controller controls the power to the convective heater prior to the infant support assuming the incubator configuration so as to create a heat reservoir which may be infused into the enclosure upon the infant support assuming the incubator configuration.

28. The control system of claim 27 wherein the convective heater controller controls the power to the convective heater immediately after the infant support assumes the incubator configuration to compensate for heat which will be infused from the heat reservoir.

29. The control system of claim 14 wherein the convective heater controller controls the power to the convective heater prior to the infant support assuming the incubator configuration so as to create a heat reservoir which may be infused into the enclosure upon the infant support assuming the incubator configuration.

30. The control system of claim 29 wherein the convective heater controller controls the power to the convective heater immediately after the infant support assumes the incubator configuration to compensate for heat which will be infused from the heat reservoir.

31. A control system for an infant support of the type capable of assuming and transiting between a closed configuration wherein an enclosure is defined around an infant support surface and an open configuration, the infant support having a convective heater, a blower and duct work communicating with the enclosure, convective heater and blower, the control system comprising a convective heater controller controlling the power to the convective heater while the infant support is in the open configuration so as to prewarm portions of the duct work past which air to be infused into the enclosure will pass, and a blower controller controlling the power to the blower to provide a reduced air flow while the infant support is in the open configuration.

32. The control system of claim 31 wherein the convective heater controller controls the power to the convective heater prior to the infant support assuming the closed configuration based on the ambient temperature of a room in which the infant support is located.

33. The control system of claim 32 wherein the convective heater controller controls the power to the convective heater prior to the infant support assuming the closed configuration based on the current power to the convective heater.

34. The control system of claim 33 wherein the blower controller increases the air flow upon infant support assuming the closed configuration.

35. The control system of claim 32 wherein the blower controller increases the air flow upon infant support assuming the closed configuration.

36. The control system of claim 31 wherein the convective heater controller controls the power to the convective heater prior to the infant support assuming the closed configuration based on the current power to the convective heater.

37. The control system of claim 36 wherein the blower controller increases the air flow upon infant support assuming the closed configuration.

38. The control system of claim 31 wherein the convective heater controller controls the power to the convective heater prior to the infant support assuming the closed configuration so as to create a heat reservoir which may be infused into the enclosure upon the infant support assuming the closed configuration.

39. The control system of claim 38 wherein the convective heater controls the power to the convective heater immediately after the infant support assumes the closed configuration to compensate for heat which will be infused from the heat reservoir.

40. The control system of claim 39 wherein the blower controller increases the air flow upon infant support assuming the closed configuration.

41. The control system of claim 38 wherein the blower controller increases the air flow upon infant support assuming the closed configuration.

42. The control system of claim 31 wherein the blower controller increases the air flow upon infant support assuming the closed configuration.

43. A method of controlling the temperature of an infant in an incubator/warmer of the type having an open configuration for operating as an infant warmer, a closed configuration forming an enclosure for operating as an incubator, a housing supporting an infant support, an air temperature sensor positioned to be within the enclosure when the incubator/warmer is in the closed configuration, a radiant heater, and an air heating system including an air heater, a blower and duct work located in the housing below the infant support, said duct work being in fluid communication with the enclosure, the method comprising the steps of operating the air heater and the blower while the incubator/warmer is in the open configuration to generate a heat reservoir and infusing the heat from the generated heat reservoir into the enclosure upon incubator/warmer attaining the closed configuration.

44. The method of claim 43 further comprising the step of operating the blower at a speed near stall speed during the operating the air heater step.

45. The method of claim 44 further comprising the step of increasing the blower speed upon the incubator/warmer attaining the closed configuration.

46. The method of claim 45 further comprising the step of controlling power to the air heater during the increasing the blower speed step to compensate for heat being infused from the heat reservoir.

47. The method of claim 44 wherein the operating the air heater step includes the step of controlling the power to the air heater based upon an air set point temperature desired in the enclosure upon transition to the closed position.

48. The method of claim 43 wherein the operating the air heater step includes the step of controlling the power to the air heater based upon the ambient temperature in a room in which the incubator/warmer is located.

49. The method of claim 43 further comprising the step of controlling power to the air heater during the infusing step to compensate for heat being infused from the heat reservoir.

50. The method of claim 43 comprising the steps of selecting an infant skin temperature set point, sensing the skin temperature of the infant, and supplying power to the radiant heater when the incubator/warmer is in the open configuration based upon the difference between the infant skin set point temperature and the skin temperature of the infant.

51. The method of claim 50 wherein the operating the air heater step includes the step of controlling the power to the air heater based upon the power supplied to the radiant heater.

* * * * *